United States Patent
Wolff

Patent Number: 6,125,619
Date of Patent: Oct. 3, 2000

[54] IMPLEMENT OR MACHINE COMPRISING A WORKING UNIT ARTICULATED TO A CARRYING STRUCTURE, AND METHOD OF ARTICULATION

[75] Inventor: Michel Wolff, Waltenheim sur Zorn, France

[73] Assignee: Kuhn S.A., Saverne, France

[21] Appl. No.: 09/070,910

[22] Filed: May 4, 1998

[30] Foreign Application Priority Data

May 6, 1997 [FR] France ................................ 97 05752

[51] Int. Cl.⁷ .................................................. A01D 34/66
[52] U.S. Cl. .................................................. 56/14.9; 56/6
[58] Field of Search ................... 56/14.9, 6, 7, 15.1, 56/15.2, 15.7, 15.8, 255, 295, DIG. 14

[56] References Cited

U.S. PATENT DOCUMENTS

| | | |
|---|---|---|
| 4,557,104 | 12/1985 | Toillie et al. . |
| 4,730,445 | 3/1988 | Wolff . |
| 4,761,940 | 8/1988 | Wolff . |
| 5,101,616 | 4/1992 | Wolff . |
| 5,241,809 | 9/1993 | Wolff et al. . |
| 5,353,579 | 10/1994 | Wolff . |
| 5,353,580 | 10/1994 | Wolff . |
| 5,724,794 | 3/1998 | Wolff . |

FOREIGN PATENT DOCUMENTS

| | | |
|---|---|---|
| 0 525 402 A1 | 2/1993 | European Pat. Off. . |
| 0 642 731 A1 | 3/1995 | European Pat. Off. . |
| 0 740 898 A2 | 11/1996 | European Pat. Off. . |
| 2 255 839 | 7/1975 | France . |
| 2 614 755 | 11/1988 | France . |
| 40 07 735 A1 | 9/1991 | Germany . |
| 44 15 205 C1 | 2/1995 | Germany . |

Primary Examiner—Robert E. Pezzuto
Attorney, Agent, or Firm—Oblon, Spivak, McClelland, Maier & Neustadt, P.C.

[57] ABSTRACT

Implement or machine which can be moved along a work surface, which includes a carrying structure or chassis, a working unit articulated to the carrying structure or chassis, and a device for connecting the carrying structure or chassis and the working unit together, wherein the connecting device includes at least one parallelogram connection which can be converted into a quadrilateral connection.

22 Claims, 5 Drawing Sheets

IMPLEMENT OR MACHINE COMPRISING A WORKING UNIT ARTICULATED TO A CARRYING STRUCTURE, AND METHOD OF ARTICULATION

BACKGROUND OF THE INVENTION

1. Field of the Invention

The present invention relates to the technical field of agricultural implements or machines, and in particular to implements of the mower or mower-conditioner type, or to machines for treating plant matter, of the tedder or windrower type.

The invention relates to an agricultural implement or machine comprising a working unit articulated to a chassis or to a carrying structure, said unit being articulated using special-purpose means, the design of which optimizes the operation of the implement. Such optimizing is desirable, for example, when the working unit moves along the ground, which may have more or less extensive progressive unevennesses. The ground thus defines a work surface which is either flat or uneven in places, and to which the implement or machine needs to adapt if work of a uniform quality is to be obtained.

The position of the working unit with respect to the chassis has therefore to be modifiable so as to take account of the various configurations of the ground.

2. Discussion of the Background

Producing an implement or machine capable of being moved over a work surface and comprising:

a carrying structure or chassis, a working unit articulated to said carrying structure or chassis, with a connecting device, which comprises at least one parallelogramm connection which can be automatically converted into any quadrilateral connection, is already known.

The use of a method of articulating a working unit to a carrying structure or chassis, especially for an agricultural machine, which includes:

placing the working unit in a normal work position;

moving the working unit over a work surface; and adapting the position of the working unit to suit the unevennesses encountered on the work surface, is also known.

Indeed, document FR-A-2,458 981 discloses an agricultural machine in which use is made of a parallelogram connection for moving a working unit with respect to a chassis. Such movements allow the working unit, for example a cutting mechanism, to be lowered or raised from a normal work position. The working unit can thus adapt to the unevennesses of the ground over which it is moving. The machine described in this document does, however, have the drawback of not taking into consideration the different configurations of the unevennesses. This may give rise to non-optimal adapting of the working unit to suit the ground and therefore to malfunctioning of or damage to the machine.

From another source, document EP-A-0 339 231 describes, in particular, a mower provided with a cutting mechanism, the mowing cutters of which define a working plane.

This cutting mechanism is supported on a support frame or chassis, via a connecting device, so that said working plane can be inclined about an axis transversal to the direction of travel of the mower. The balancing device as described, has a special structure for making the axis transverse to the direction of travel via an instantaneous center of rotation situated beneath the working plane. Such a connecting device makes it possible to make the front of the working plane pivot upward or downward in order to adapt to unevenness of the ground which corresponds respectively to unevenness of the more or less extensive obstacle and hole type.

A device of this kind may nonetheless have major drawbacks. This is because this connecting device still does not allow all types of unevenness to be overcome in an optimum way. Thus, when the machine and therefore a working unit of the cutting mechanism type gradually enters a hole in a downward direction, the working plane inclines in the same downward direction. The cutting mechanism therefore has an angular orientation which is often poorly suited to attacking the somewhat abrupt upwards slope at the other end of the hole. It inappropriately tends to directly attack the ground and dig into it. Damage to its cutters and mechanical stresses which are detrimental to the machine as a whole are therefore obvious and inevitable consequences under these conditions. Another drawback of such a device is associated with a certain lack of stability when moving over uneven ground. This phenomenon is often accentuated with high forward speeds which may lead to premature wear on the various articulations supporting the cutting mechanism.

Document DE-40 07 735 discloses a mower, comprising a carrying structure, a cutting unit articulated to said carrying structure with a connection device. The latter comprises an articulated link system which allows the cutting unit to rotate upwardly and downwardly so as to follow the unevennesses of the work surface.

Each unevenness that is met by the cutting unit, causes its upward or downward rotation, to fit at best with the shape of the said unevenness.

Such an adaptation to the work surface or soil, does not permit to overcome the above mentioned drawbacks.

SUMMARY OF THE INVENTION

The object of the present invention aims to overcome the drawbacks of the state of the art.

The object of the present invention is therefore to produce an implement or machine in which the working unit which, for example, comprises mowing, tedding or soil-working tools, adopts optimum angular positions relative to the unevennesses encountered as the implement or machine moves over the ground.

The set objectives of the present invention are achieved using a method of articulating a working unit to a carrying structure or chassis, especially for an agricultural machine, consisting in:

placing the working unit in a normal work position;

moving the working unit over a work surface;

if necessary moving the working unit to obtain additional raising or lowering with respect to the normal work position, keeping the angular orientation of the working unit with respect to the chassis constant during an additional lowering;

which consists in:

acting on the angular orientation of the working unit starting from a given amount of raising, by pivoting said working unit about a real or virtual pivot axis, transverse to the direction of forward travel, said pivoting allowing obstacles encountered on the work surfaces to be overcome in an optimum way.

The objectives of the present invention are also achieved using an implement or machine comprising:

a carrying structure or chassis, a working unit articulated to said carrying structure or chassis, with a connecting device which comprises at least one parallelogram connection which can be automatically converted into any quadrilateral connection, wherein the connection device comprises means for converting said connection, starting from a given additional amount of raising of the working unit.

The implement or machine may also comprise the features listed below considered in isolation or in any technically possible combination.

Advantageously, the connecting device comprises at least one system of links for providing the connection between a carrying structure or chassis and the working unit.

The machine or implement in accordance with the invention may also comprise a positioning system, of the hydraulic jack type, for moving a working unit between a lowered working position and a raised transport position, and vice versa.

The machine or implement in accordance with the invention may also comprise a blocking mechanism for setting down said machine or implement after it has been used, in a position which makes future hitching or connecting to a tractor easier, and which corresponds to a particular angular orientation and/or particular amount of raising of the working unit.

An advantage of this invention lies in limiting as far as possible the jolts which are detrimental to the structure and the mower itself.

BRIEF DESCRIPTION OF THE DRAWINGS

Other features and advantages of the invention will become clear from reading the detailed description of non-limiting embodiments, which description refers, in particular, to the appended drawings in which.

DESCRIPTION OF THE PREFERRED EMBODIMENT

The implement depicted in FIGS. 1 to 7 is a disk mower which can be hitched to the front of a tractor. Other hitching or trailing possibilities may also be envisaged without departing from the scope of the present invention. The invention is not in any way restricted to this one embodiment. The connecting device in accordance with the invention can be adapted to any kind of implement or agricultural or civil engineering works machine, the working unit of which moves over and/or close to the ground or a wall.

Figure 1:
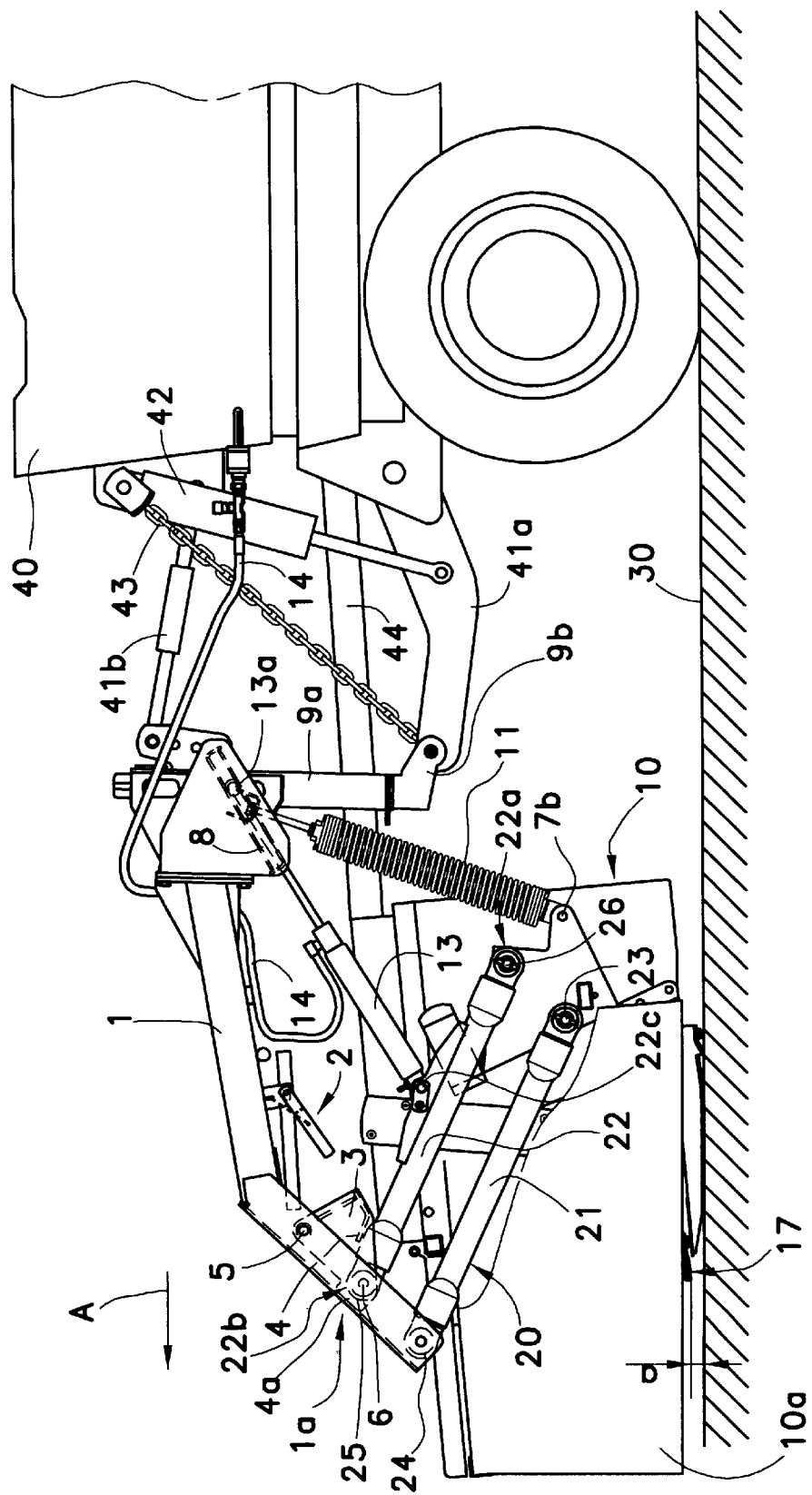
FIG. 1 depicts a side view of one embodiment of an implement or machine in accordance with the invention, the working unit of which is in a normal work position.

FIG. 1 depicts a side view of a first embodiment of an implement in accordance with the invention, in a normal work position. The implement comprises a chassis 1 made in several pieces joined together. A female triangle 9a of the chassis 1 is intended for hitching to a tractor 40 using a three-point lift system. The latter thus comprises two lower links 41a and a top link 41b which are secured to a male triangle 9b complementing the triangle 9a. The three-point lift system is advantageously operated by a lifting ram 42. The lift system depicted in FIGS. 1 to 4 is also associated with a positioning chain 43 which limits the downward travel of the lower links 41a with a view to correctly positioning the chassis 1 relative to the ground 30 in the normal work position. The machine or implement operates using a transmission shaft 44 connected to the tractor 40. The machine in accordance with the invention preferably has a guard 10a, which has been partially cut away to make it easier to see the constituent parts of the machine.

The implement in accordance with the invention also comprises a working unit 10 corresponding, for example, to a cutting mechanism with disks 17. The working unit 10 is connected to the chassis 1 by means of a connecting device 20. The latter has mechanical means that allow the working unit 10 to float with respect to the chassis 1 and therefore allow the unit 10 to be raised or lowered by additional amounts starting from a normal work position. The mechanical means thus comprise a positioning system of the hydraulic jack 13 type for moving the working unit 10 between a work position and a raised transport position, and vice versa. The hydraulic jack 13 is supplied by a pipe 14 connected to the tractor 40. The positioning system is articulated to the working unit 10 and has an anchoring point 13a on the chassis 1 sliding in a travel slot 8. The latter is formed in the chassis 1 in such a way as to allow the floating of the working unit 10 when said unit is in the work position. The anchoring point 13a may be obtained using any means, and especially using a screw or a rod or a stud passing through the travel slot 8. The floating of the working unit 10 is therefore possible only after an at least partial extension of the hydraulic jack 13. Full retraction of the hydraulic jack 13 corresponds to a raised position of the working unit 10, which relates to a transport position.

The connecting device 20 preferably comprises a system of links 21, 22 for providing the connection between the chassis 1 and the working unit 10.

The system of links 21, 22 is advantageously associated with a support piece 3 articulated to the chassis 1. One 22 of the links 21; 22 is articulated by means of an articulation 26 to the working unit 10 with its first end 22a, its second end 22b being articulated to the support piece 3 by means of an articulation 25 of axis 6. Said support piece 3 for its part can rotate on the chassis 1 and about an axis 5 which is offset with respect to the axis 6 of articulation of the link 22, so as to produce an additional link.

Figure 3:
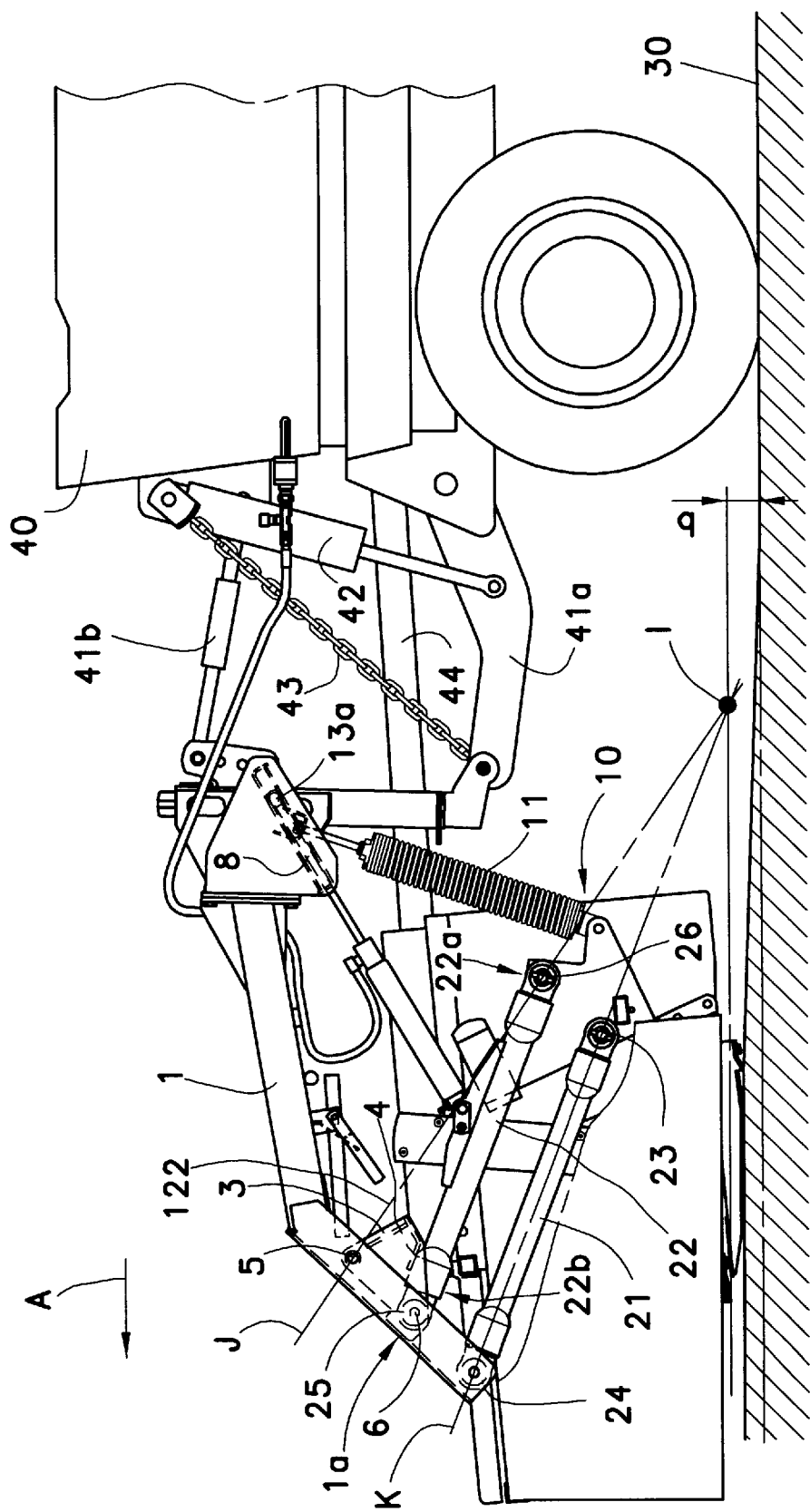
FIG. 3 depicts a side view of the implement or of the machine of FIG. 1, the working unit of which is in a work position that corresponds to a given amount of raising.
Figure 4:
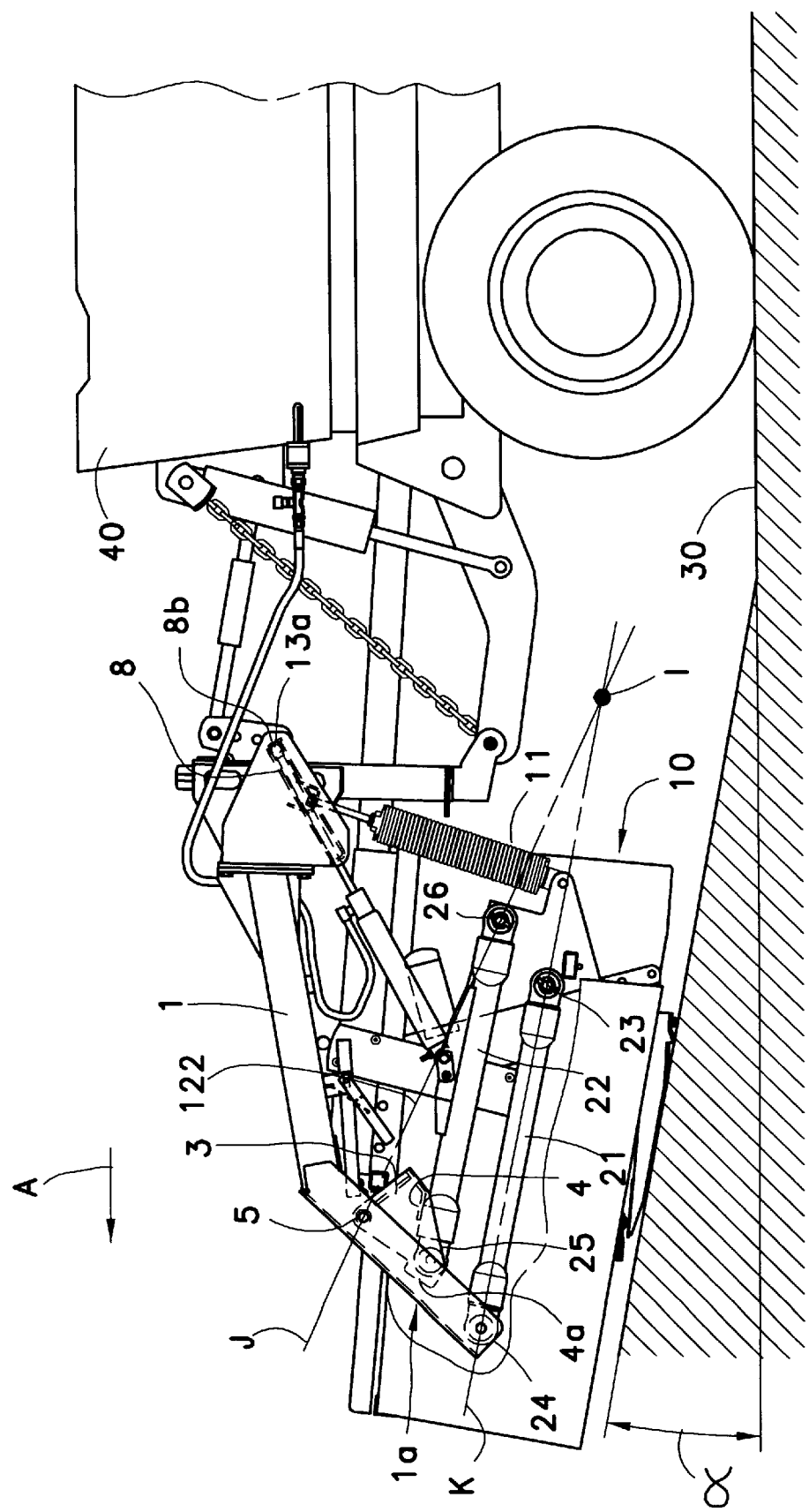
FIG. 4 depicts a side view of the implement or of the machine of FIG. 1, the working unit of which is in a raised work position.

The support piece 3 is also fitted with a stop 4 against which the link 22 can come to rest, so that said link 22 and said support piece 3 then rotate together about the axis 5, forming an imaginary link 122 articulated at 26 to the working unit 10 and at 5 to the chassis 1 (cf. FIGS. 3 and 4).

According to the embodiment depicted in FIGS. 1 to 4, the system of links 21, 22 comprises a lower link 21 directly connecting the working unit 10 to the chassis 1 and an upper link 22 connecting the working unit 10 to the support piece 3.

The connecting device 20 advantageously forms a parallelogram connection which can be converted into any quadrilateral connection in order to obtain pivoting or the inclining of the working unit 10. For this purpose, the connecting device 20 comprises means for converting the parallelogram connection into any quadrilateral connection, starting from a given additional amount of raising (cf. FIG. 3). This upwardly-pointing inclination makes it possible, for example, to increase the distance between the attacking front of the working unit 10 or to modify the angular orientation with respect to the ground 30 and therefore pass more easily over obstacles. Inclining takes place only starting from a given amount of raising of the working unit 10. Below this limiting amount, the connecting device 20 makes a parallelogram connection allowing only a floating movement, namely a lowering or a raising that has no impact on the angular orientation of the working unit 10 with respect to the chassis 1. Conversion of the parallelogram connection into any quadrilateral connection is automatic and requires no adjustment or particular manipulation during the operation of the machine in accordance with the invention. This conversion is brought about, as the case may be, merely by the nature of the obstacles encountered by the working unit 10. No intervention from the user of the machine is needed during operation to convert the connecting device 20.

Thus, the stop 4 rests on the link 22 starting from a given amount of raising of the working unit 10. A raising of the unit 10 that exceeds this given amount or limiting amount thus causes the parallelogram connection to convert into any quadrilateral connection. This conversion is obtained by bringing the imaginary link 122 into operation in place of the link 22.

The links 21, 22 are of the same length and preferably run upwards in the direction of forward travel A of the implement or of the machine. With such a configuration of the connecting device 20, and in particular of the links 21, 22, the working unit 10 is therefore drawn for work.

The hydraulic jack 13 is preferably attached to the upper link 22 using a connecting means 22c. Advantageously, the machine or implement in accordance with the invention may comprise a hydraulic jack 13 on each lateral side.

According to another embodiment of the machine in accordance with the invention, the hydraulic jack 13 may also be fixed directly to the working unit 10.

FIGS. 3 and 4 depict how the imaginary link 122 becomes operational in place of the upper link 22. The generatrix passing through the centers of the articulations 23 and 24 and the generatrix passing through the axis 5 and the articulation 26 intersect at a point of intersection which defines an instantaneous center of rotation I. The connecting device 20 thus makes it possible to define an instantaneous center of rotation I for the working unit 10, and to do so above and beyond a given amount of raising.

The construction and dimensions of the various mechanical means are advantageously chosen to determine an optimum amount of raising before any modification in the angular orientation of the working unit 10 relative to the chassis 1 takes place and before the instantaneous center of rotation I appears.

The angular orientation of the working unit 10 relative to the chassis 1 remains constant for a given amount or range of movement corresponding, if the case arises, to a lowering or a raising with respect to a normal work position.

The working unit 10 begins pivoting, starting from a limiting amount of raising.

According to an additional embodiment of the implement or of the machine in accordance with the invention, the support piece 3 is fitted with a stop 4 which is adjustable or orientable so as to modify the limiting amount of raising before the instantaneous center of rotation I appears. Appropriate adjusting screws or other means may be provided for this.

The links 21, 22 are preferably articulated using articulations 23, 24, 25 and 26 of the spherical type.

According to another additional embodiment of the implement or of the machine in accordance with the invention, one of the links 21, 22 is made using a piece of variable length of the hydraulic jack type. Thus, by way of example not depicted in the figures, the upper link 22 may be replaced by a hydraulic jack, the extending of which causes the working unit 10 to pivot about a real pivot axis passing through the center of the articulation 23. The extending or retracting of the jack may be controlled by any means, and in particular with sensors of physical magnitudes. These sensors make it possible, for example, to detect obstacles on the work surface (i.e., ground 30) via a slight rotational movement of one of the links 21, 22 and/or a particular amount of raising of the working unit 10.

The extending of the jack makes it possible to apply to the unit 10 a couple which brings about an adequate slight rotation about the actual pivot axis passing through the center of the articulation 23.

The mechanical means also and advantageously comprise an elastically deformable means fixed respectively to anchoring points 7a and 7b on the chassis 1 and on the working unit 10, to reduce the reaction forces when said unit 10 is resting on the ground 30.

The anchoring point 7b is located on the working unit 10 in such a way that the elastically deformable means exerts a couple on said unit 10, tending to convert any quadrilateral connection back into a parallelogram connection (in the embodiment depicted, the elastically deformable means creates compression in the upper link 22). The support piece 3 therefore has a special shape in order to produce an additional stop 4a which comes to rest on a region 1a of the chassis 1, or on the working unit 10, as depicted respectively in FIGS. 1 to 4 and in FIGS. 5 to 7. A solution of this kind proves particularly advantageous when the working unit 10 is moving over uneven ground. This ground will tend to make the unit 10 come away from the ground, particularly at high forward speeds. This is because the forces exerted on the working unit 10 are directed in various directions and in particular in directions which encourage said unit 10 to rise up.

The machine in accordance with the invention thus makes the working unit 10 more stable relative to the ground.

The elastically deformable means is, for example, a float spring 11. The tension in the float spring 11 can, incidentally, be modified using an adjusting screw 12 which by any known means connects said spring 11 to the chassis 1. Advantageously, the anchoring point 7b is located on a part of the working unit 10 in such a way that the return force of the float spring 11 opposes the tilting or pivoting of the unit 10 and therefore opposes the pivoting of the support piece 3 about the axis 5. A design of this kind makes it possible on the one hand to stabilize the connecting device 20, especially when the machine is advancing at high speeds, and on the other hand to return the working unit 10 to its initial angular orientation upon lowering following an additional raising of said unit 10.

A machine or implement in accordance with the invention preferably comprises a connecting device 20 with a system of links 21, 22 on its lateral sides. It is also possible, without departing from the scope of the present invention, to produce an implement which has a link 21 on its lateral sides and just one link 22 fitted on one lateral side or arranged more or less centrally in or on the implement.

The connecting device 20 in accordance with the invention is depicted in FIGS. 1 to 4 in various configurations and various positions of the working unit 10 of an agricultural machine, in this case a mower. The implement depicted in the figures is intended to be hitched to a tractor or connected to the lift system of a tractor.

FIG. 1 depicts the working unit 10 in a normal work position.

Figure 2:
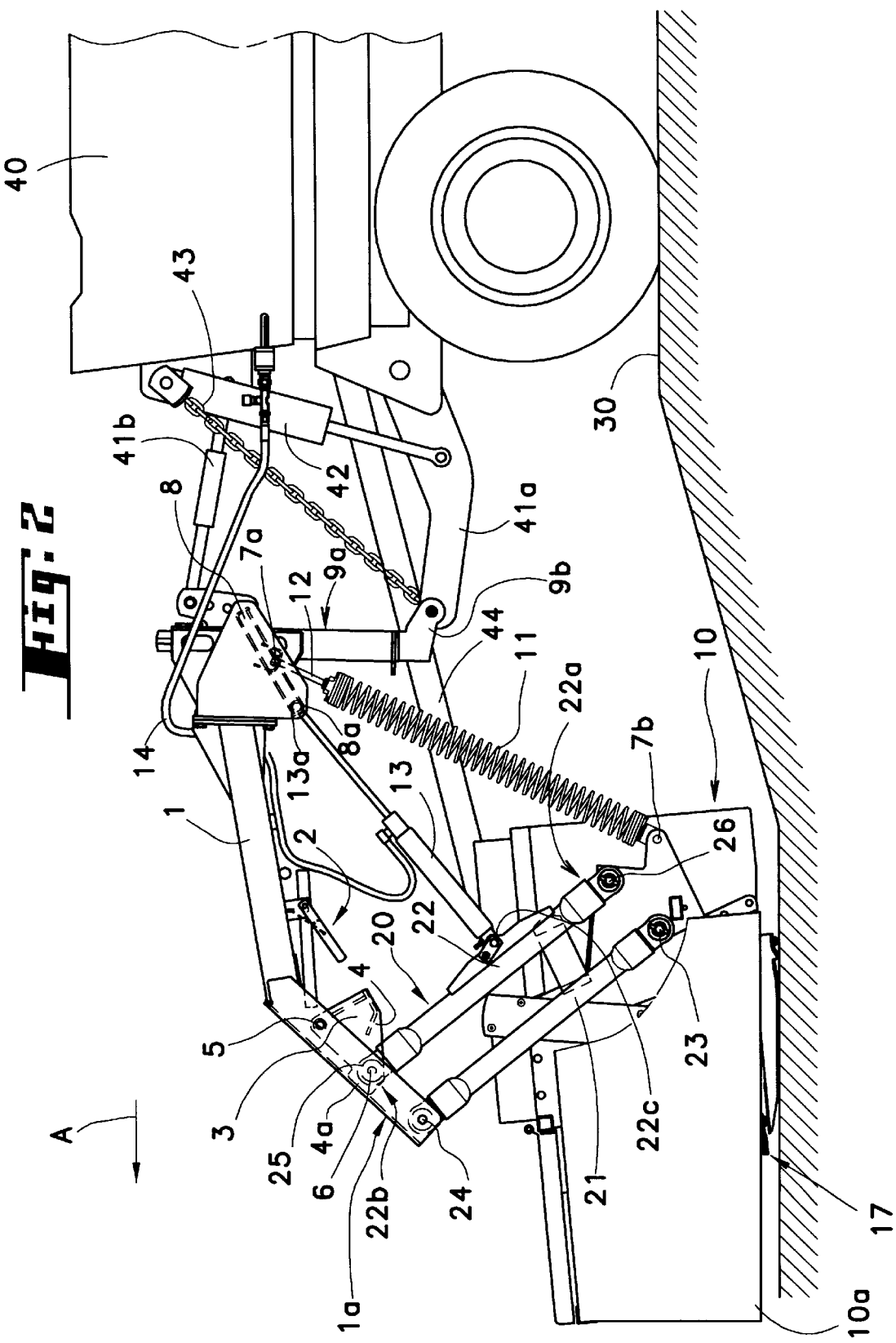
FIG. 2 depicts a side view of the implement or of the machine of FIG. 1, the working unit of which is in an extreme lowered work position.

FIG. 2 depicts the working unit 10 in an extreme lowered work position, which position is obtained by moving said unit 10 away from the chassis 1 using the parallelogram connection. This extreme position is delimited by the maximum extension of the hydraulic jack 13 and by the position of the anchoring point 13a of the hydraulic jack 13, which anchoring point 13a is resting against the lower end 8a of the travel slot 8. The links 21, 22 remain mutually parallel, therefore not causing the working unit 10 to pivot.

FIG. 3 depicts a higher work position than the position in FIG. 1. The travel of the hydraulic jack 13, supported by the action of the float spring 11, thus allows the upper link 22 to be brought against the stop 4. This corresponds to the maximum amount or limiting amount of raising of the working unit 10 which does not alter the parallelogram configuration of the system of links 21, 22.

Figure 7:
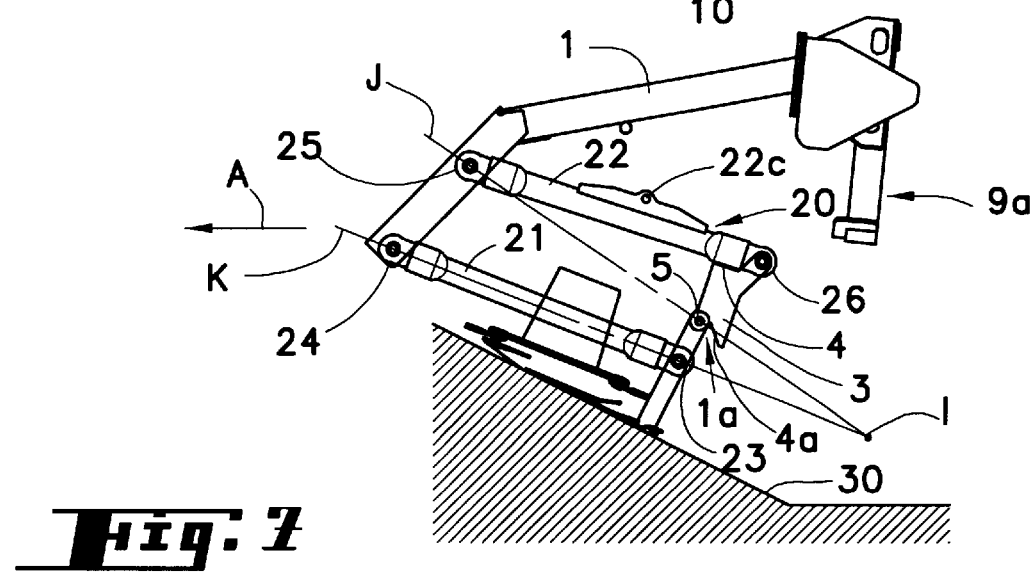

Starting from this given amount of raising, it is possible to represent the instantaneous center of rotation I of the working unit 10, which center is located at the intersection of the imaginary portions IK and IJ shown in FIGS. 3, 4 and 7.

The portion IK is defined by an imaginary straight line passing through the center of the articulations 23 and 24, while the portion IJ is defined by an imaginary straight line passing through the center of the articulation 26 and the axis 5 which constitutes the axis about which the support piece 3 rotates.

Additional raising to the level already experienced in FIG. 3 of the working unit 10, therefore leads to the parallelogram being converted into any quadrilateral or into a trapezium according to a design choice not depicted.

FIG. 4 shows the working unit 10 in a raised position corresponding to an ultimate work position which is reached when the anchoring point 13a of the hydraulic jack 13 is up against the top end 8b of the travel slot 8.

In such a raised position, the working unit 10 has an upward inclination in the direction of forward travel A of the machine or of the implement. Such an angular orientation of the attacking front of the cutting mechanism and therefore of the disks 17 allows obstacles or unevennesses to be attacked in an optimum way.

An orientation by an angle α referenced in FIG. 4, for example of the order of 2° to 20° of the cutting mechanism with respect to a horizontal direction, can easily be obtained. Any other angular orientation may be suitable, depending on the specific requirements or dictates.

Figure 5:
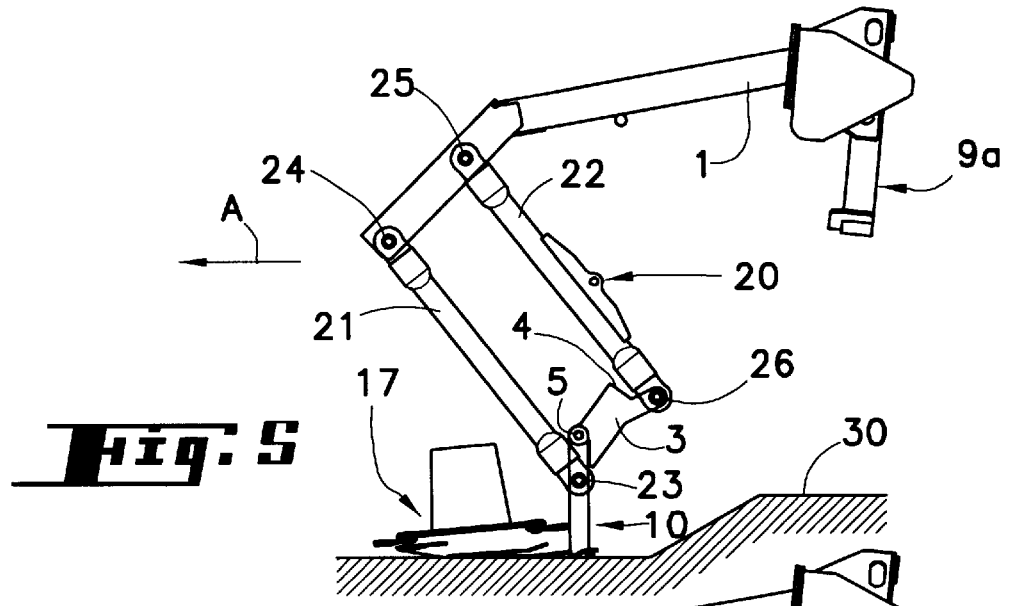
FIGS. 5, 6 and 7 each depict a partial side view of another embodiment of the machine or of the implement in accordance with the invention.
Figure 6:
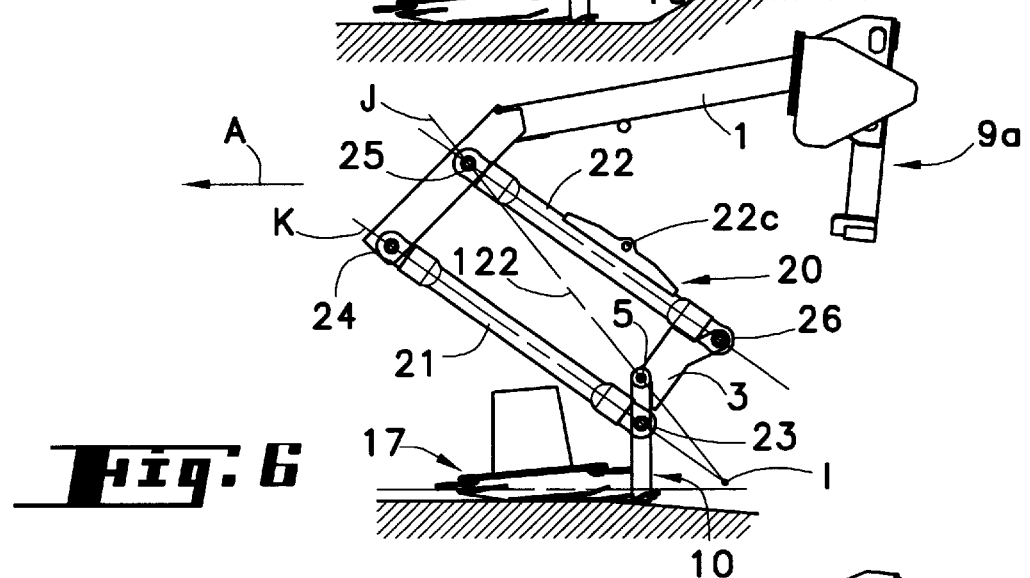

According to another embodiment of the machine in accordance with the invention, and depicted in FIGS. 5, 6 and 7, the support piece 3 is mounted so that it can rotate on the articulation 26 of the link 22. The additional stop 4a can come to rest on the working unit 10 when the connecting device 20 has a parallelogram configuration. Such a situation is shown, for example, in FIG. 5, where the working unit 10 has been lowered by an additional amount compared with a normal work position. After the working unit 10 has been raised by a given amount, as depicted diagrammatically in FIG. 6, the stop 4 comes to rest against the upper link 22. The link 22 and the support piece 3 therefore convert into the imaginary link 122 articulated at 25 to the chassis 1 and at 5 to the working unit 10, and the instantaneous center of rotation I appears. This center is located at the intersection between the imaginary generatrices IJ and IK of FIGS. 6 and 7. FIG. 7 thus shows the passage of the working unit 10 over an unevenness or obstacle in the ground 30.

It is also possible to arrange the support piece 3 with modifications of appropriate forms on the articulations 23 or 24 without departing from the scope of the present invention.

One of the ends of the chassis 1 comprises the female triangle 9a for connecting the implement or the machine to a tractor 40. It is therefore important to maintain a minimum inclination of the plane of extension of this triangle 9a with respect to a vertical direction. Furthermore, the implement generally rests on the working unit 10, whose angular orientation determines the inclination of the plane of extension of the triangle 9a.

The implement or the machine in accordance with the invention may advantageously comprise a blocking mechanism 2 for setting said machine down, after it has been used, in a position which will make future hitching or connection to a tractor 40 easier, and which corresponds to a particular angular orientation and/or a particular amount of raising of the working unit 10.

The blocking mechanism 2 is therefore mounted on the chassis 1 to block the raising of the working unit 10 at a height which has no negative impact on the inclination of the triangle 9a when the implement is being set down. The blocking mechanism 2 is preferably retractable when the machine is in use.

The advantage afforded by such a blocking mechanism 2 is substantial in that this mechanism makes the operations of connecting the machine to the lifting system of a tractor 40 easier. Numerous tricky and time-consuming adjusting operations can thus be avoided.

The device described makes it possible to employ a method of articulating the working unit 10 to the chassis 1 of the machine or of the implement. This method allows the machine to adapt to various configurations or unevennesses of the work surface (ground 30) allowing the working unit 10 to pivot, when appropriate, about an instantaneous center of rotation I. The description of this method also makes it possible to illustrate the operation and behavior of the implement or of the machine in accordance with the invention. The method of articulation consists in particular in moving the working unit 10 over a work surface 30 in a direction of forward travel A and, thanks to a floating movement, in allowing additional raising or lowering of the working unit 10 relative to the normal work position while keeping the angular orientation of said unit 10 with respect to the chassis 1 constant during additional lowering. The method then consists in acting on the angular orientation of the unit 10, starting from a given amount of raising, by pivoting about an actual or imaginary pivot axis transverse to the direction of forward travel A of the machine, said pivoting making it possible to negotiate obstacles in an optimum way. The working unit 10 undergoes no modification to its angular orientation with respect to the horizontal or with respect to the chassis 1 until its proximity to the chassis 1 has reached a given amount. This modification corresponds to the appearance of an instantaneous center of rotation I and of an upward tilting or pivoting movement of the working unit 10 moving along the ground 30. The location of the instantaneous center of rotation I is determined by the structure of the connecting device 20, and allows the unit 10 to be subjected to forces capable of making the working unit 10 tilt slightly.

The operation and above all the advantages of the implement in accordance with the invention are immediately obvious insofar as the adaptation to unevennesses is automatic. What happens is that the working unit 10 tilts upward, for example with the aid of a rotation about an imaginary axis passing through the instantaneous center of rotation I when a significant obstacle or obstacle liable to damage the implement is encountered. When the uppermost point of the obstacle has been passed, the working unit 10 drops back down toward its normal work position, and the angular orientation of the working unit 10 returns to its initial value which corresponds to said normal work position. Lowering of the working unit 10 beyond the limiting amount, defined for raising, will have no further impact on the angular orientation of the working unit 10. This is embodied in the absence of an instantaneous center of rotation I.

FIG. 1 depicts, by way of example, a front-mounted mower, the cutting tools of which define a work plane situated above the ground 30 by a distance a corresponding, for example, to 30 mm.

FIG. 3 depicts an additional raising of the working unit 10 by an amount needed to make the cutting tools or the disks 17 tilt upward, thanks to the appearance of the instantaneous center of rotation I.

This amount of raising of the working unit 10 corresponds to the separation b from the ground 30 and depends on the construction of the machine or more precisely of the connecting device 20 and possibly the position of the stop 4, when this position is adjustable.

The connecting device 20, in accordance with the invention allows a different behaviour of the working unit 10, depending on the configuration of the unevennesses encountered.

Without departing from the scope of the present invention, the method in accordance with the invention can be applied to other types of rear-mounted or front-mounted drawn agricultural machines, for example of the shredder type. The working unit 10 may also be designed to work the land. This invention particularly applies to drawn mowers.

What is claimed as new and desired to be secured by Letters Patent of the United States is:

1. A method of articulating a working unit to a chassis which comprises:

placing the working unit in a normal work position;

moving the working unit over a work surface;

moving the working unit to obtain additional raising or lowering with respect to the normal work position, keeping the angular orientation of the working unit with respect to the chassis constant during an additional lowering;

and acting on the angular orientation of the working unit starting from a given amount of raising, by pivoting said working unit about a pivot axis, transverse to a direction of forward travel, said pivoting allowing obstacles encountered on the work surfaces to be overcome.

2. A method as claimed in claim 1, which comprises:

tilting the front of the working unit upward when an obstacle is encountered in order to pass over the obstacle.

3. A method as claimed in claim 2, which comprises:

causing an instantaneous center of rotation of the working unit to appear, as a function of the nature of the unevennesses encountered.

4. A method as claimed in claim 3, which comprises:

locating the instantaneous center of rotation in such a way as to apply a moment of force making the working unit tilt slightly.

5. A machine which can be moved over a work surface, comprising:

a chassis, a working unit articulated to said chassis, a device for connecting the chassis and the working unit together, wherein the connecting device comprises at least one parallelogram connection which is automatically convertible into a quadrilateral connection, and a mechanism for converting said connection starting from a given additional amount of raising of the working unit.

6. A machine as claimed in claim 5, wherein the connecting device comprises a mechanism allowing the working unit to float with respect to the chassis and ensure that the unit is able to be raised or lowered by an additional amount starting from a normal work position.

7. A machine as claimed in claim 6, wherein the connecting device comprises at least one system of links for providing a connection between the chassis and the working unit.

8. A machine as claimed in claim 7, wherein the system of links comprises a support piece articulated to the chassis, one of the links being articulated to the working unit with a first end of said links, a second end of said links being articulated to the support piece by an axis of articulation.

9. A machine as claimed in claim 8, wherein the support piece is articulated to the chassis about an axis which is offset with respect to the axis of articulation of the link to the support piece, so that the said support piece forms an additional link.

10. A machine as claimed in claim 9, wherein the support piece comprises a stop member against which the link which is articulated to said piece is engageable in order to rotate said support piece about the axis and form an imaginary link.

11. A machine as claimed in claim 10, wherein the system of links comprises a lower link directly connecting the working unit to the chassis, and an upper link connecting the working unit to the support piece.

12. A machine as claimed in claim 5, the connecting device defining an instantaneous center of rotation for the working unit, upon occurrence of a predetermined additional amount of raising.

13. A machine as claimed in claim 12, wherein the connecting device comprises a hydraulic positioning mechanism for moving the working unit between a lowered working position and a raised transport position, and vice versa.

14. A machine as claimed in claim 13, wherein the positioning system is articulated to the working unit and has an anchoring point on the chassis sliding in a travel slot formed in said chassis so as to allow the working unit to float when said working unit is in a work position.

15. A machine as claimed in claim 5, wherein the connecting device comprises an elastically deformable mechanism connected respectively to anchoring points on the chassis and on the working unit in order to reduce the reaction forces when said working unit is resting on the work surface.

16. A machine as claimed in claim 7, which comprises a link system on its lateral sides.

17. A machine as claimed in claim 5, which comprises a blocking mechanism for setting down said machine after it has been used in a position so as to assist hitching to a tractor, and which corresponds to a predetermined angular orientation and a predetermined amount of raising of the working unit.

18. A machine as claimed in claim 7, wherein one of the links comprising a variable-length piece of the hydraulic jack type.

19. A machine as claimed in claim 15, wherein the anchoring point is located on the working unit in such a way as to exert a couple on said working unit, tending to return the configuration of the connection from any quadrilateral connection to a parallelogram connection.

20. A machine as claimed in claim 5, which a mower.

21. A machine as claimed in claim 5, which comprises a mower having a mechanism for treating a cut product.

22. A machine as claimed in claim 5, which comprises a blocking mechanism for lowering said machine after having been used in a position to facilitate hitching to a tractor, and which corresponds to one of a predetermined angular orientation and an amount of raising of the working unit.

* * * * *